(12) United States Patent
Childs et al.

(10) Patent No.: US 7,519,784 B2
(45) Date of Patent: Apr. 14, 2009

(54) METHOD AND APPARATUS FOR RECLAIMING SPACE IN MEMORY

(75) Inventors: Philip Lee Childs, Raleigh, NC (US); Lee Christopher Highsmith, Cary, NC (US); Christopher Scott Long, Chapel Hill, NC (US)

(73) Assignee: Lenovo Singapore Pte. Ltd., Singapore (SG)

( * ) Notice: Subject to any disclaimer, the term of this patent is extended or adjusted under 35 U.S.C. 154(b) by 205 days.

(21) Appl. No.: 11/394,793

(22) Filed: Mar. 31, 2006

(65) Prior Publication Data

US 2007/0239949 A1 Oct. 11, 2007

(51) Int. Cl.
G06F 12/00 (2006.01)
(52) U.S. Cl. .................. 711/162; 711/159; 711/165; 711/170
(58) Field of Classification Search .......... 711/159, 711/162, 165, 170
See application file for complete search history.

(56) References Cited

U.S. PATENT DOCUMENTS

| 5,765,173 A | 6/1998 | Cane et al. ............. 707/204 |
| 6,038,665 A | 3/2000 | Bolt et al. ............. 713/176 |
| 6,785,786 B1 | 8/2004 | Gold et al. ............ 711/162 |
| 6,981,114 B1 | 12/2005 | Wu et al. .............. 711/162 |
| 2003/0220948 A1 | 11/2003 | Green et al. ............ 707/204 |
| 2004/0210608 A1 | 10/2004 | Lee et al. .............. 707/204 |
| 2005/0027956 A1* | 2/2005 | Tormasov et al. ........ 711/162 |
| 2006/0282485 A1* | 12/2006 | Aggarwal et al. ........ 707/206 |
| 2006/0282627 A1* | 12/2006 | Aggarwal et al. ........ 711/154 |

FOREIGN PATENT DOCUMENTS

| DE | 102007015385 | 10/2007 |
| EP | 1349089 A2 | 1/2003 |
| EP | 1349089 A3 | 4/2005 |
| GB | 2375191 | 11/2002 |
| WO | 02/063484 | 8/2002 |

* cited by examiner

Primary Examiner—Hyung S Sough
Assistant Examiner—Mehdi Namazi
(74) Attorney, Agent, or Firm—Yee & Associates P.C.; Carlos Munoz-Bustamante

(57) ABSTRACT

A computer implemented method, data processing system, and computer usable code are provided for reclaiming backup data storage space in memory. The process receives a selection to reclaim a set of memory locations associated with a set of backup copies of a selected file. The process searches a plurality of memory locations for the set of memory locations associated with the set of backup copies. The process then removes the data associated with the set of backup copies from the set of memory locations to form a set of reclaimed memory locations. The set of reclaimed memory locations are unoccupied by data associated with the set of backup copies of the selected file.

20 Claims, 3 Drawing Sheets

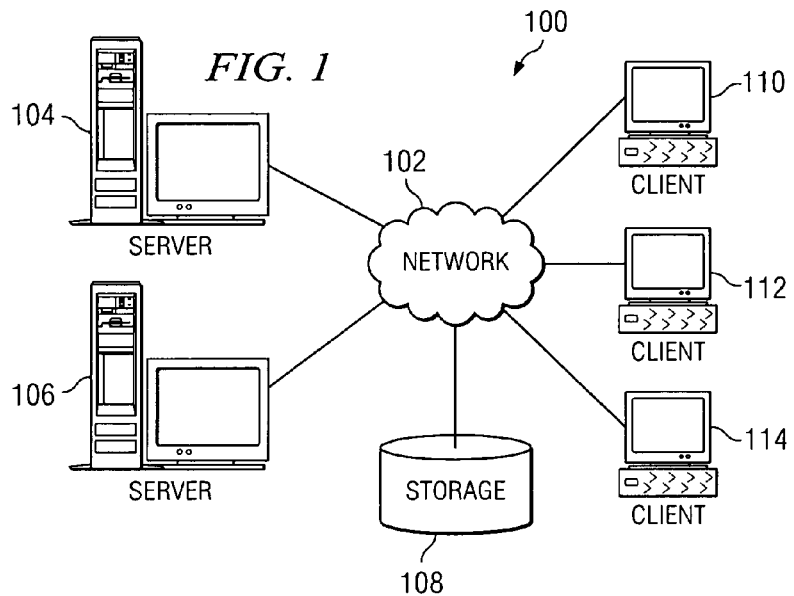

METHOD AND APPARATUS FOR RECLAIMING SPACE IN MEMORY

BACKGROUND OF THE INVENTION

1. Field of the Invention

The present invention is related generally to an improved data processing system, and in particular to a method, apparatus, and computer usable program code for managing data storage. In particular, the present invention is directed to a method, apparatus, and computer usable program code for reclaiming backup data storage space in memory.

2. Description of the Related Art

In a data processing system, files can be stored on a data storage device. The data in a file stored on a data storage device can be lost if physical damage occurs to the data storage device, a power failure occurs during an update of the file, the system crashes, the device becomes infected by a virus, or any number of other events that result in the loss or corruption of data.

A backup system creates backup copies of original files by copying data from an original file source into a backup copy of the original file. The backup system performs incremental backups of an original file. In other words, if an original file has been updated or modified since the last version of a backup copy was created, the new data is copied to a backup storage device, either as an update to the last backup copy or as a new version backup copy. Thus, multiple versions of backup copies for an original file can exist in one or more backup data storage devices. The backup copies permit the recovery of lost or corrupted data in the original file. However, the backup copies consume data storage space that could otherwise be made available for other data or program storage.

A backup system can offer the ability to prevent the creation of additional new version backup copies of a file during future backup operations. In addition, a backup system can permit a user to designate a single instance of a backup copy of a file to be maintained and updated during future backup operations, rather than creating additional or multiple new versions of backup copies to save memory space. In this manner, a user can save space that would otherwise be used in future backup operations because the backup system does not create additional or multiple new backup copies of certain designated files. However, any pre-existing backup copies of the original files that are stored on any data storage device associated with the backup system will continue to exist.

BRIEF SUMMARY OF THE INVENTION

The different aspects of the illustrative embodiments provide a computer implemented method, apparatus, and computer usable code for reclaiming backup data storage space in memory. The process receives a selection to reclaim a set of memory locations associated with a set of backup copies of a selected file. The process searches a plurality of memory locations for the set of memory locations associated with the set of backup copies. The process then removes the data associated with the set of backup copies from the set of memory locations to form a set of reclaimed memory locations. A reclaimed memory location is unoccupied by data associated with the set of backup copies of the selected file.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation of a network of data processing systems in which aspects of the present invention may be implemented;

FIG. 2 is a block diagram of a data processing system in which aspects of the present invention may be implemented;

DETAILED DESCRIPTION OF THE INVENTION

Figure 3:
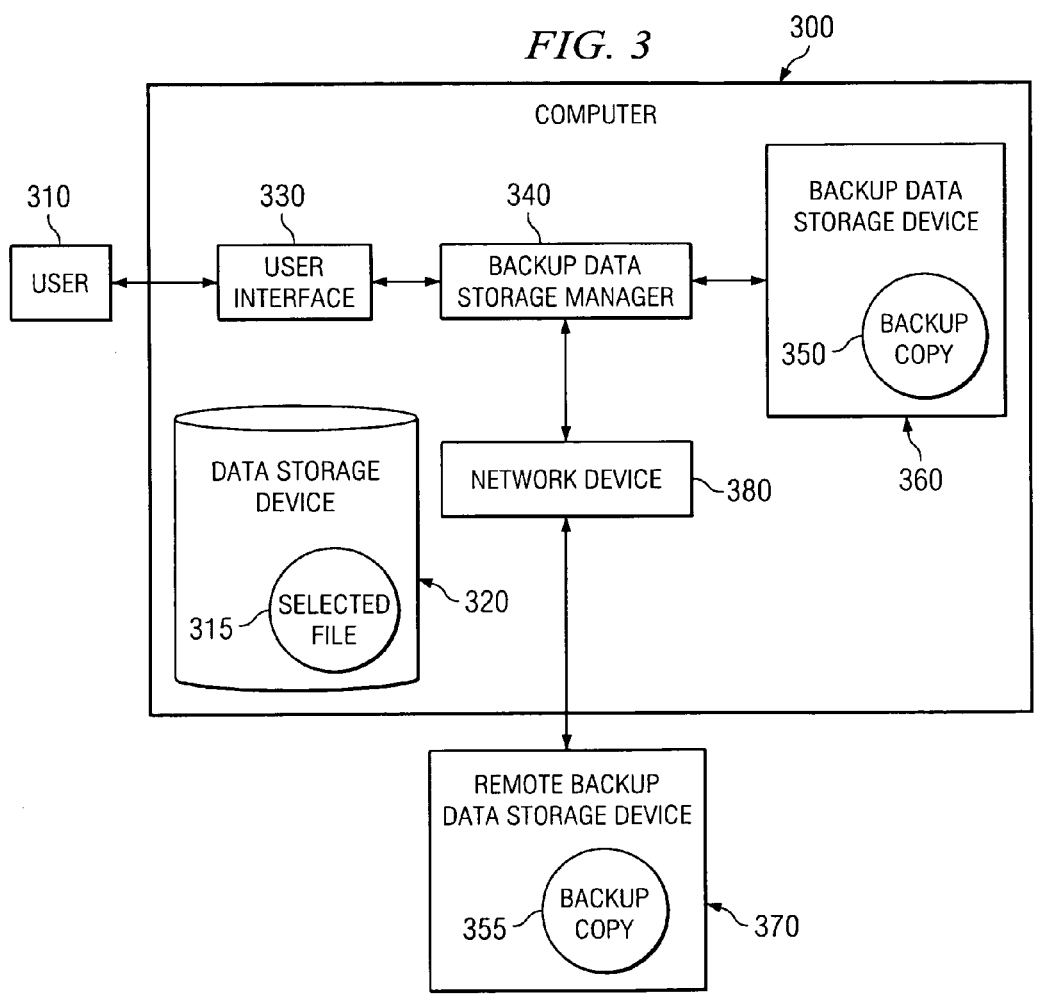
FIG. 3 is a block diagram illustrating data flow in a process for reclaiming backup data storage space in at least one memory location in accordance with an exemplary embodiment of the present invention.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the present invention may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

In a data processing system, files can be stored on a data storage device. As used herein, a file includes data, numerical information, textual information, program records, and/or any collection of related and/or unrelated data, information, or program records stored as a unit under a single name on a data storage device.

A backup system stores backup copies of the original files in order to permit a user to recover the files in the event that a power failure, virus, device failure, or other event results in the loss or corruption of the original files. However, in order to reclaim the space in a backup data storage device, current backup systems require a user to delete all backup data stored on the backup storage device.

In order to save space on a backup data storage device, a backup program can offer the ability to prevent the creation of additional new backup copies of a file by designating a file as a single instance storage file. In such a case, only a single backup copy of the file is created and maintained, rather than multiple backup copies. The single backup copy is updated to coincide with updates to the original file but additional new backup versions of the original file are not created in future backup operations. In addition, a user can designate a particular file as a future backup exclusion file in order to prevent the creation of any additional backup copies of the file in the future. However, pre-existing backup copies of the files that were created prior to the user designating the file as a single instance storage file or a future backup exclusion file will continue to exist in storage on the hard disk. Moreover, currently available recovery programs do not provide a capability to delete backup copies of one or more selected file(s) from a backup storage device without deleting all backup copies associated with a backup set.

Therefore, the aspects of the present invention are directed to a method, apparatus, and computer usable program code for reclaiming backup data storage space in memory. The process receives a selection to reclaim a set of memory locations associated with a set of backup copies of a selected file. The process searches a plurality of memory locations for the set of memory locations associated with the set of backup copies. The process then removes the data associated with the set of backup copies from the set of memory locations to form a set of reclaimed memory locations. The reclaimed memory locations are unoccupied by data associated with the set of backup copies of the selected file.

FIG. 3 is a block diagram illustrating data flow in a process for reclaiming backup data storage space in at least one memory location in accordance with an exemplary embodiment of the present invention. Computer 300 is a computing device, including but not limited to a server, a client, a personal computer, a laptop, a tablet computer, a personal digital assistant (PDA), a cellular phone or any other computing device depicted in FIG. 1 and FIG. 2. User 310 utilizes computer 300 to select to reclaim a set of memory locations associated with a set of backup copies of a selected file.

In accordance with this illustrative embodiment, user 310 selects a file from a plurality of files associated with computer 300 to form selected file 315. Selected file 315 is any type of file stored on a data storage device, such as data storage device 320. Data storage device 320 is any type of known or available device for storing data, including, but not limited to, a hard disk, an optical disk, such as a compact disc rewritable (CD-R), or a digital video disk rewritable (DVD-R), a floppy disk, a ZIP disk, magnetic tape, a flash memory, a memory card, a memory stick, a network storage device, or any other known or available device, component, or recording media for storing data.

Data storage device 320 is a permanent, non-volatile storage. In other words, the data stored on data storage device 320 will remain stored on the device when power is removed from data storage device 320. In this illustrative example, data storage device 320 is located on computer 300. However, in accordance with another embodiment of the present invention, data storage device 320 is located separately from computer 300.

User interface 330 is an application that allows user 310 to invoke backup data storage manager 340 in order to reclaim data storage space being utilized to store backup copies of selected file 315. Backup data storage manager 340 is an application for reclaiming space in a data storage device allocated to a backup copy of a selected file, such as backup copy 350 and 355, located on a backup storage device, such as backup storage device 360 and remote backup storage device 370.

Backup copy 350 and 355 are existing backup copies of selected file 315. Backup data storage device 360 is a data storage device, such as data storage device 320, associated with computer 300. Remote backup data storage device 370 is any type of data storage device that is not located on computer 300. Computer 300 is accesses remote data storage device 370 through a network connection via network device 380.

Network device 380 is any type of network access software known or available for allowing computer 300 to access a network. Network device 380 connects to a network connection, such as network 102 in FIG. 1. The network connection permits access to any type of network, such as a local area network (LAN), a wide area network (WAN), or the Internet.

In this illustrative example, user 310 selects a file stored on data storage device 320 to form a selected file. In order to select a file, backup data storage manager 340 presents a list of files to user 310 via user interface 330. User selects a file from the list to form selected file 315.

Backup data storage manager 340 locates backup copy 350 of selected file 315 associated with backup data storage device 360. In this illustrative example, backup copy 350 is stored in a memory location associated with a hard disk on computer 300.

Backup data storage manager 340 also locates backup copy 355 of selected file 315 associated with remote backup data storage device 370 via network device 380. Backup data storage manager 340 presents a list of backup copies 350 and 355 associated with selected file 315 to user 310 via user interface 330. User 310 selects one or more pre-existing backup copies associated with selected file 315 to be deleted in order to reclaim backup data storage space in memory. In this illustrative example, user 310 selects to remove backup copy 350 and backup copy 355 from data storage device 360 and 370. Backup copies 350 and 355 form a set of backup copies of selected file 315. The memory location or memory space associated with backup copy 350 and 355 forms a set of memory locations for backup copies associated with selected file 315.

In response to receiving a selection from user 310 to reclaim the set of memory locations associated with the set of backup copies, including backup copy 350 and 355, backup data storage manager 340 deletes backup copy 350 and backup copy 355 from backup data storage device 360 and remote backup data storage device 370 to free memory space on backup data storage device 360 and remote backup data storage device 370 for use by other applications and/or programs.

In accordance with an illustrative embodiment, user interface 330 presents user 310 with a plurality of original files associated with computer 300. User 310 selects two or more files from the plurality of files to form a set of selected files. Backup data storage manager 340 receives a selection from user to reclaim a set of memory locations associated with a set of backup copies of each file in the set of selected files. Thus, backup data storage manager 340 searches the plurality of memory locations associated with computer 300 for memory locations containing one or more backup copies of any file in the set of selected files, to form the set of memory locations. User 310 selects to remove a set of backup copies associated with the selected set of identified files. Backup data storage manager 340 removes the set of backup copies from the set of memory locations associated with one or more data storage devices, such as data storage devices 320, 360, and 370 associated with computer 300.

As used herein, the term "set of selected files" includes one or more files stored on one or more data storage devices. Likewise, a set of backup copies refers to a single backup copy of a single file, two or more copies of a single file, and/or two or more copies two or more disparate files in the set of files.

As used herein, a memory location associated with computer 300 includes a data storage device located on computer 300, such as data storage device 320 and 360, as well as a remote data storage device that is located separately from computer 300. Thus, a memory location associated with computer 300 includes any memory location available or accessible to computer 300, including memory locations accessed by computer 300 via a network connection.

As used herein, a backup data storage device associated with computer 300 includes a backup data storage devices located locally to computer 300, as well as remote backup data storage devices accessed by computer 300 via a network connection.

In accordance with another illustrative embodiment of the present invention, user 310 designates selected file 315 as a future backup exclusion file. Backup data storage manager 340 will not create an additional new version backup copy of a selected file designated as a future backup exclusion file during any future backup operations.

In addition, backup data storage manager 340 will remove all instances of backup copies of a selected file designated as a future backup exclusion file from all data storage devices, such as backup data storage device 360 and 370. In accordance with another embodiment of the present invention, backup data storage manager 340 will only remove pre-existing backup copies of a future backup exclusion file that are selected or identified by user 310.

In accordance with another embodiment, a user designates selected file 315 as a single version instance file. In such a case, backup data storage manager 340 creates and maintains a single version backup copy of a file designated as a single instance storage file. The single instance backup copy is updated by backup data storage manager 340 as necessary to reflect changes and/or updates made to selected file 315 by user 310. However, backup data storage manager will not create any other additional instances of a backup copy of selected file 315 in any data storage device. In addition, backup data storage manager 340 will delete/remove all other instances of a backup copy of selected file 315 from all data storage devices, with the exception of the designated single instance backup copy.

In accordance with another embodiment, if the user wants backup data storage manager 340 to permit creation of new instances of backup copies of the selected file in the future, the user can change the designation of the selected file to a future backup enabled file. Backup data storage manager 340 will permit additional instances of a backup copy of selected file 315 to be created in one or more data storage devices if selected file 315 is designated as a future backup enabled file. Backup data storage manager 340 will not remove any other instances of a backup copy of selected file 315 from any data storage devices.

In accordance with another illustrative embodiment of the present invention, backup data storage manager 340 presents user 310 with a list of all files that are designated as single instance storage files and future backup exclusion files. User selects one or more original files from the list to form a set of selected files. Backup data storage manager 340 searches for all backup copies of the identified/selected files in backup data storage devices associated with computer 300. Backup data storage manager deletes all instances of a backup copy associated with each identified/selected file designated as a future backup exclusion file. Backup data storage manager 340 deletes all instances of a backup copy associated with each identified file designated as a single instance storage file, with the exception of one backup copy associated with each original single instance storage file. Each single instance backup copy is updated as necessary to coincide with updates made to the original single instance storage file.

In this illustrative example, backup copy 350 and 355 are stored in memory locations associated with backup data storage devices that are separate components from data storage device 320 on which selected file 315 is stored. However, in accordance with another embodiment of the present invention, one or more backup copies of selected file 315 can be stored on the same data storage device as selected file 315.

Figure 4:
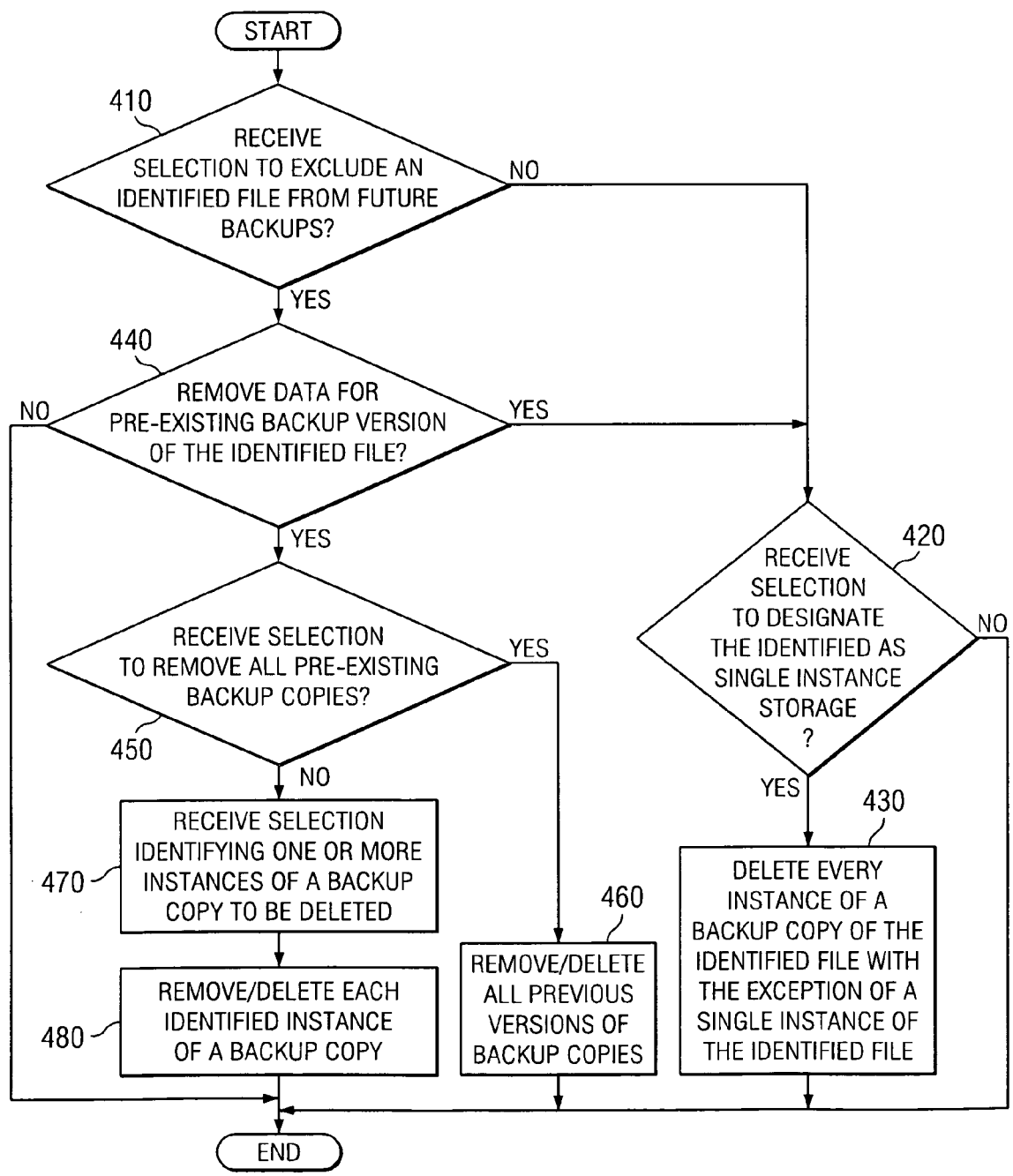
FIG. 4 is a flowchart outlining an exemplary operation of the present invention when backup data storage space is reclaimed from one or more memory locations in accordance with an illustrative embodiment of the present invention.

FIG. 4 is a flowchart outlining an exemplary operation of the present invention when backup data storage space is reclaimed from one or more memory locations in accordance with an illustrative embodiment of the present invention. The process is performed by a software component, such as backup data storage manager 340 in FIG. 3.

The process determines if a selection has been received from a user to exclude an identified/selected file from future backups (step 410). In accordance with one embodiment of the present invention, a user can select to exclude an identified file from future backups by designating the file as a future backup exclusion file. If the process determines that a selection to exclude the identified file from future backups is not received, the process determines if a selection has been received from a user to designate the identified file as a single instance storage file (step 420). If the process determines that a selection has not been received from a user to designate the identified file as a single instance storage file, the process terminates.

Returning now to step 420, in response to a determination that a selection to designate the identified file as a single instance storage file has been received, the process deletes every instance of a backup copy of the identified file with the exception of a single instance of the identified file (step 430) which is maintained and updated as necessary. The process terminates thereafter.

Returning now to step 410, if a selection has been received to exclude an identified file from future backups, the process determines if a selection has been received to remove data for any pre-existing backup versions of the identified file (step 440). In response to a determination that a selection has not been received to remove all data associated with all pre-existing backup versions of the identified file, the process terminates.

Returning to step 440, if a selection has been received to remove data for any pre-existing backup versions of the identified file, the process determines if a selection has been received to remove all pre-existing backup copies (step 450) of the identified file. If a selection has been received to remove data for any pre-existing backup versions of the identified file, the process removes or deletes all previous/pre-existing versions of backup copies (step 460) of the identified file. The process terminates thereafter.

Returning now to step 450, if a selection has been received to remove data for any pre-existing backup versions of the identified file has not been received, the process receives a selection identifying one or more instances of a backup copy of the identified file to be removed/deleted from a data storage device (step 470). The process then removes or deletes each identified instance of a backup copy (step 480) to be deleted. The process terminates thereafter.

The flowchart and block diagrams in the figures illustrate the architecture, functionality, and operation of possible implementations of methods, apparatus, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

Although specific examples of how the different components may be implemented have been provided, these examples are not meant to limit the architecture in which the aspects of the illustrative embodiments may be used. The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for reclaiming backup data storage space in memory, the computer implemented method comprising:
    selecting a file using a graphical user interface of the computer;
    determining a set of backup copies of the selected file;
    presenting the set of backup copies of the selected file on the graphical user interface;
    receiving a selection to reclaim a set of memory locations associated with the set of backup copies of the selected file from the graphical user interface;
    searching a plurality of memory locations for the set of memory locations; and
    removing data associated with the set of backup copies from the set of memory locations to form a set of reclaimed memory locations, wherein a reclaimed memory location is unoccupied by data associated with the set of backup copies of the selected file.

2. The computer implemented method of claim 1, wherein the receiving step further comprises:
    receiving a selection to designate the selected file as a future backup exclusion file, wherein a new backup copy of the selected file designated as a future backup exclusion file is not created in future backup operations.

3. The computer implemented method of claim 1, wherein the receiving step further comprises:
    receiving a selection to designate the selected file as a single instance backup storage file, wherein a second instance of a backup copy for the selected file designated as a single instance backup storage file is not created in a future backup operation after a first instance of the backup copy of the selected file is created.

4. The computer implemented method of claim 1, wherein at least one memory location in the set of memory locations is associated with a hard disk.

5. The computer implemented method of claim 1, wherein the receiving step further comprises:
    searching all backup copies of files associated with a data processing system to identify each backup copy of the selected file, wherein the identified backup copies of the selected file form the set of backup copies, and wherein backup copies of the selected file associated with the set of memory locations are deleted from a backup storage device without deleting all backup copies of the file in the set of backup copies.

6. The computer implemented method of claim 1, wherein the removing step further comprises:
    deleting all data from the set of backup copies to free storage space associated with the set of memory locations.

7. The computer implemented method of claim 1, wherein the receiving step further comprises:
    receiving a selection to reclaim a set of memory locations associated with a set of backup copies of a set of selected files.

8. A computer program product comprising:
    a computer readable storage medium having computer usable program code stored on the computer readable storage medium for reclaiming backup data storage space in memory, the computer program product comprising:
    computer usable program code for selecting a file using a graphical user interface of the computer;
    computer usable program code for determining a set of backup copies of the selected file;
    computer usable program code for presenting the set of backup copies of the selected file on the graphical user interface;
    computer usable program code for receiving a selection to reclaim the set of memory locations associated with the set of backup copies of a selected file from the graphical user interface;
    computer usable program code for searching a plurality of memory locations for the set of memory locations; and
    computer usable program code for removing data associated with the set of backup copies from the set of memory locations to form a set of reclaimed memory locations, wherein a reclaimed memory location is unoccupied by data associated with the set of backup copies of the selected file.

9. The computer program product of claim 8, wherein the computer program code for receiving further comprises:
    computer usable program code for receiving a selection to designate the selected file as a future backup exclusion file, wherein a new backup copy of the selected file designated as a future backup exclusion file is not created in future backup operations.

10. The computer program product of claim 8, wherein the computer program code for receiving further comprises:
    computer usable program code for receiving a selection to designate the selected file as a single instance backup storage file, wherein a second instance of a backup copy for the selected file designated as a single instance backup storage file is not created in a future backup operation after a first instance of the backup copy of the selected file is created.

11. The computer program product of claim 8, wherein at least one memory location in the set of memory locations is associated with a hard disk.

12. The computer program product of claim 8, wherein the computer program code for receiving further comprises:
computer usable program code for searching all backup copies of files associated with a data processing system to identify each backup copy of the selected file, wherein the identified backup copies of the selected file form the set of backup copies, and wherein backup copies of the selected file associated with the set of memory locations are deleted from a backup storage device without deleting all backup copies of the file in the set of backup copies.

13. The computer program product of claim 8, wherein the computer program code for removing further comprises:
computer usable program code for deleting all data from the set of backup copies to free storage space associated with the set of memory locations.

14. The computer program product of claim 8, wherein the computer program code for receiving further comprises:
computer usable program code for receiving a selection to reclaim a set of memory locations associated with a set of backup copies of a set of selected files.

15. An apparatus for reclaiming backup data storage space in memory, the apparatus comprising:
a computer comprising:
a bus;
a storage device connected to the bus, wherein the storage devices contains a computer usable program product;
a processor unit, wherein the processor unit executes the computer usable program product to select a file using a graphical user interface of the computer, determine a set of backup copies of the selected file, present the set of backup copies of the selected file on the graphical user interface, receive a selection to reclaim the set of memory locations associated with the set of backup copies of a selected file from the graphical user interface; search a plurality of memory locations for the set of memory locations; and remove data associated with the set of backup copies from the set of memory locations to form a set of reclaimed memory locations, wherein a reclaimed memory location is unoccupied by data associated with the set of backup copies of the selected file.

16. The apparatus of claim 15, wherein executing the computer usable program code to receive further comprises:
executing the computer usable program code to receive a selection to designate the selected file as a future backup exclusion file, wherein a new backup copy of the selected file designated as a future backup exclusion file is not created in future backup operations.

17. The apparatus of claim 15, wherein executing the computer usable program code to receive further comprises:
executing the computer usable program code to receive a selection to designate the selected file as a single instance backup storage file, wherein a second instance of a backup copy for a selected file designated as a single instance backup storage file is not created in a future backup operation after a first instance of the backup copy of the selected file is created in a memory location.

18. The apparatus of claim 15, wherein executing the computer usable program code to receive further comprises:
executing the computer usable program code to search all backup memory locations to identify each backup copy of the selected file to form the set of backup copies, and wherein backup copies of the selected file associated with the set of memory locations are deleted from a backup storage device without deleting all backup copies of the file in the set of backup copies.

19. The apparatus of claim 15, wherein executing the computer usable program code to remove further comprises:
executing the computer usable program code to delete all data from the set of backup copies to free storage space associated with the set of memory locations.

20. The apparatus of claim 15, wherein executing the computer usable program code to receive further comprises:
executing the computer usable program code to receive a selection to reclaim a set of memory locations associated with a set of backup copies of a set of selected files.

* * * * *